Jan. 1, 1929.
N. A. OLUND
1,697,471
AUTOMOBILE TOP
Filed July 6, 1927
2 Sheets-Sheet 1
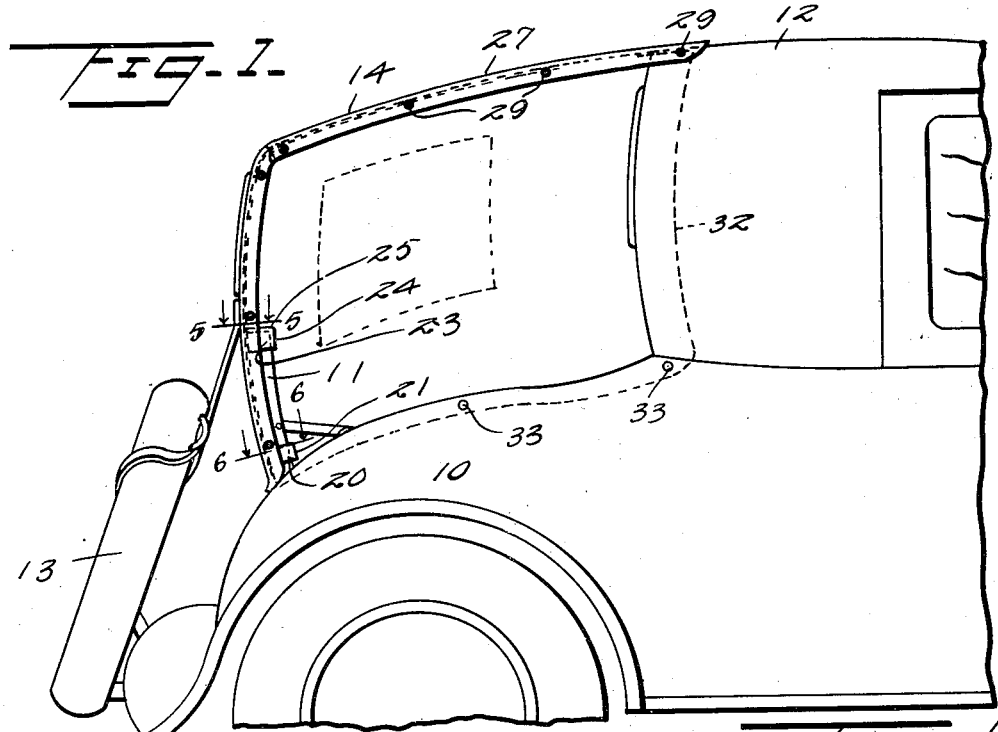
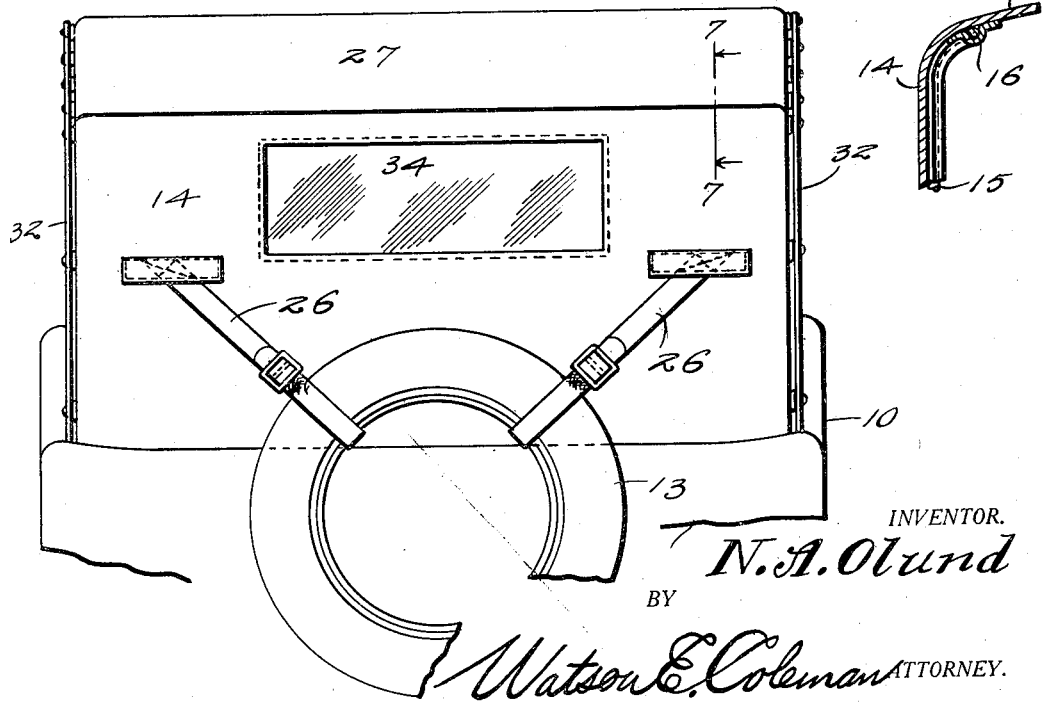
INVENTOR.
N. A. Olund
BY
Watson E. Coleman ATTORNEY.

Jan. 1, 1929.
N. A. OLUND
1,697,471
AUTOMOBILE TOP
Filed July 6, 1927   2 Sheets-Sheet 2
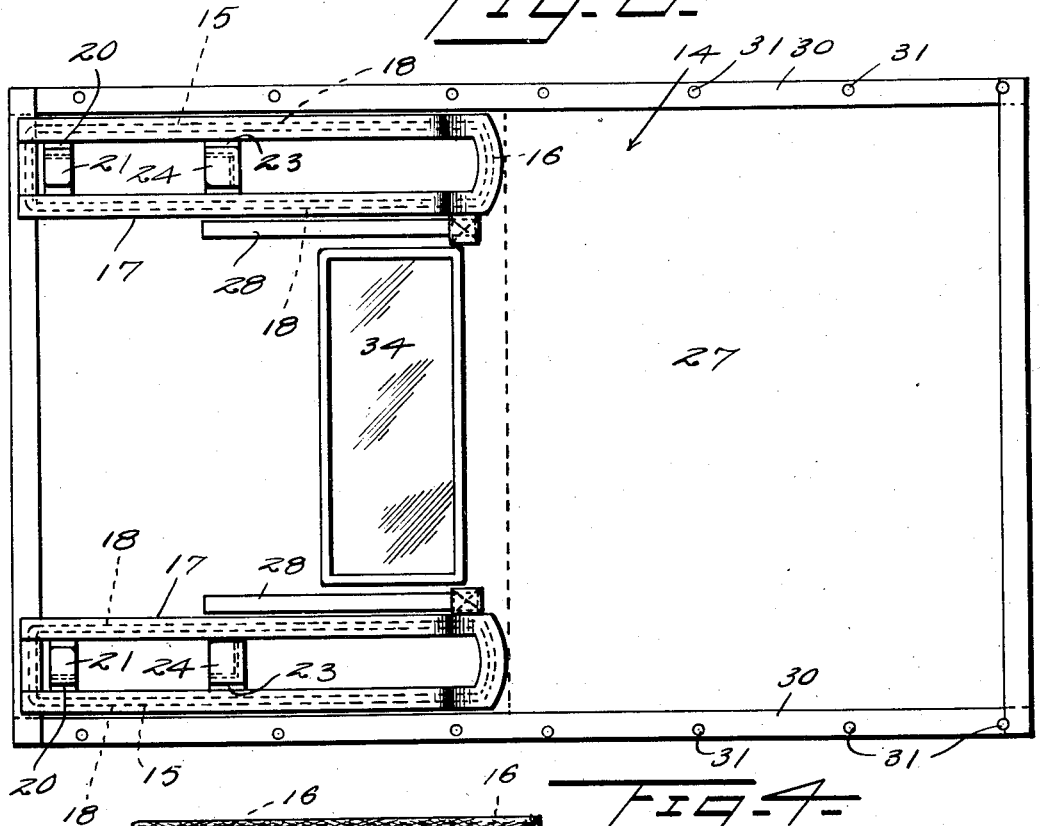
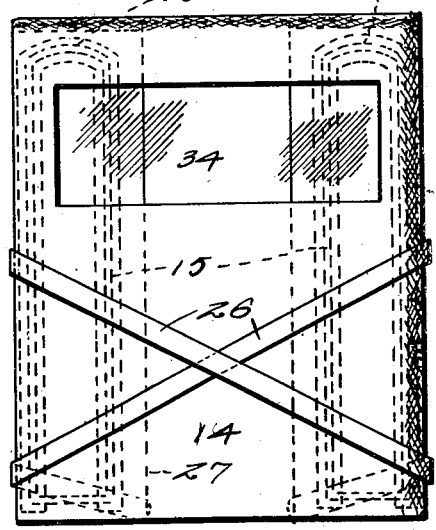
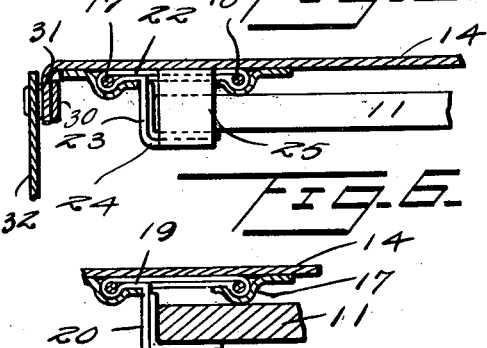
INVENTOR.
N. A. Olund
BY
Watson E. Coleman ATTORNEY.

Patented Jan. 1, 1929.

1,697,471

UNITED STATES PATENT OFFICE.

NELS A. OLUND, OF CAMBRIDGE, MINNESOTA.

AUTOMOBILE TOP.

Application filed July 6, 1927. Serial No. 203,841.

This invention relates to automobile tops and more particularly to attachments providing a top for the rumble seats of automobiles.

An important object of the invention is to provide a device of this character which may be employed upon rumble seats, the backs of which are folded to hide the seat which is of such construction that it may be readily folded and stored away when not in use.

A further object of the invention is to provide a novel and improved means for attaching the top to the vehicle body and the seat back.

These and other objects I attain by the construction shown in the accompanying drawings, wherein for the purpose of illustration is shown a preferred embodiment of my invention and wherein:—

Figure 1 is a side elevation of the rear portion of an automobile showing a top constructed in accordance with my invention applied to cover the rumble seat thereof, the side curtains being indicated in dotted lines;

Figure 2 is a rear elevation of the vehicle with the cover applied;

Figure 3 is an inner face view of the cover removed;

Figure 4 is a view of the cover folded for storage;

Figure 5 is an enlarged section on the line 5—5 of Figure 1;

Figure 6 is a section on the line 6—6 of Figure 1;

Figure 7 is a section on the line 7—7 of Figure 2.

Referring now more particularly to the drawings, the numeral 10 generally designates the turtle back of a runabout, a portion of which is formed by a pivoted seat back 11 for the rumble seat. In advance of the rumble seat is the usual operator's seat top 12 and at the rear of the rumble seat is usually disposed a tire carrier upon which is mounted the spare tire 13.

In accordance with my invention, I provide a cover comprising a substantially rectangular cloth body 14 along one end of which at each side is disposed a longitudinally extending metallic brace 15, the lower ends of which substantially coincide with one end edge of the fabric body and the upper ends of which terminate at the approximate center of the fabric body and are arcuately curved, as more clearly shown at 16 in Figure 7. These braces are in the form of open substantially rectangular frames which are applied directly to the fabric body and secured thereto by covering and concealing bindings 17. The side members 18 of these frames adjacent their lower ends are connected by strap iron yokes 19, each yoke having adjacent the outer edge an outstanding flange 20, the terminal of which is provided with an angular extension 21 directed toward the other of the flanges. Above the yokes 19, the side members 18 are connected by yokes 22 similar to the yokes 21 and each provided adjacent its outer edge with an outstanding flange 23 having a terminal extension 24 which is directed toward the other of the flanges 23. The yoke 22 is connected with this latter flange by a plate 25. The flanges 20 and 23 are spaced apart a distance equal to the width of the seat back 11 and the flanges 21 and 24 are adapted to engage the front face of the seat back while the braces are engaged with the rear face thereof. The plate 25 seats upon the upper edge of the seat back to limit downward movement of the braces thereon. Secured to the rear face of the fabric sheet 14 adjacent each side thereof and at the end thereof to which the braces 15 are applied, are straps 26 which are adapted to be passed downwardly and around the spare tire and buckled to hold this portion of the sheet and accordingly the braces against vertical movement. While the spare tire provides a convenient means for attaching these straps, it will, of course, be understood that any fixed portion of the vehicle body may be employed as a means for attaching the same.

The cover is applied by moving the end thereof having the braces 15 downwardly to engage the flanges 20 and their extensions 21 and 24 with the seat back until the downward movement is limited and then securing the straps 26. This is preferably done while the portions 27 of the sheet which form the hood of the top are rolled and secured by straps 28 which are attached to the inner face of the fabric cover adjacent the upper end of each brace. After the occupant has reached the seat, these straps may be released and the portion 27 extended forwardly and secured to the top 12, by means of snap fasteners 29 at the forward ends of the side edges of the portion 27. The fabric sheet 14 along its side edges is reinforced at 30 and provided with snap fasteners 31 for coaction with side curtains 32. These side curtains, as indicated in Figure 1, may also be engaged with fasteners 33 carried by the turtle back.

It will be obvious that a device of this character may be very readily applied to and removed from the automobile, may be readily folded for storage and when in applied position, will not interfere with the rear vision of the operator, since the rear wall of the top may be provided with the sight glass 34. It will also be obvious that the construction herein set forth is capable of a certain range of change and modification without materially departing from the spirit of the invention and I accordingly do not limit myself to such specific structure except as hereinafter claimed.

I claim:—

1. A top and back curtain structure for an automobile rumble seat having an upstanding back, comprising a pair of elongated brace arms each designed to be arranged in upright position adjacent one side edge of said back, yoke members carried by each frame for engagement over the adjacent edge of the back, a fabric covering connecting the frames and extending throughout the length of the same and over the upper ends thereof for attachment to an adjacent part of an automobile, and means carried by the fabric between and adjacent each frame for attachment to a fixed part of the automobile whereby said frames may be drawn toward each other for making positive connection with the seat back.

2. A top and back curtain for an automobile rumble seat having an upstanding back, comprising a pair of elongated brace frames each formed of a pair of parallel bar members having connecting bars between their adjacent ends and each designed to be arranged in upright position at the back and adjacent one side of the seat back, a yoke connecting the side members of each frame adjacent the lower end of the same, an outstanding flange carried by each yoke for engagement over the adjacent edge of the back, a second yoke connecting the side members of each frame above the first mentioned yokes, means carried by each of said second yokes for receiving the adjacent corner of the seat back, a fabric covering connecting said frames and extending over the upper ends of the same for attachment to a forwardly positioned part of the vehicle, and means for maintaining the frames in positive engagement with the seat back.

3. A top and back curtain for an automobile rumble seat having an upstanding back, comprising a pair of elongated brace frames each formed of a pair of parallel bar members having connecting bars between their adjacent ends and each designed to be arranged in upright position at the back and adjacent one side of the seat back, a yoke connecting the side members of each frame adjacent the lower end of the same, an outstanding flange carried by each yoke for engagement over the adjacent edge of the back, a second yoke connecting the side members of each frame above the first mentioned yokes, means carried by each of said second yokes for receiving the adjacent corner of the seat back, a fabric covering connecting said frames and extending over the upper ends of the same for attachment to a forwardly positioned part of the vehicle, and means for maintaining the frames in positive engagement with the seat back, said frames having their upper ends turned to extend forwardly of the vehicle to give a rounded appearance to the rear edge of the top.

4. A top and back curtain for an automobile rumble seat having an upstanding back, comprising a pair of elongated brace frames each formed of a pair of parallel bar members having connecting bars between their adjacent ends and each designed to be arranged in upright position at the back and adjacent one side of the seat back, a yoke connecting the side members of each frame adjacent the lower end of the same, an outstanding flange carried by each yoke for engagement over the adjacent edge of the back, a second yoke connecting the side members of each frame above the first mentioned yokes, means carried by each of said second yokes for receiving the adjacent corner of the seat back, a fabric covering connecting said frames and extending over the upper ends of the same for attachment to a forwardly positioned part of the vehicle, and bracing straps each attached at one end to one of said frames and designed to be drawn in opposite directions across the rear of said back for attachment to a fixed element to maintain said frames in positive engagement with the back.

In testimony whereof I hereunto affix my signature.

NELS A. OLUND.